United States Patent [19]
Petitfrere et al.

[11] Patent Number: 6,044,556
[45] Date of Patent: *Apr. 4, 2000

[54] METHOD OF PRODUCING ROLLERS FOR AGRICULTURAL MACHINES

[75] Inventors: Michel Petitfrere, Fleury; Jeanot Ostermann; Arsene Roth, both of Metz, all of France

[73] Assignee: Claas KGaA, Harsewinkel, Germany

[*] Notice: This patent issued on a continued prosecution application filed under 37 CFR 1.53(d), and is subject to the twenty year patent term provisions of 35 U.S.C. 154(a)(2).

[21] Appl. No.: 08/868,195

[22] Filed: Jun. 3, 1997

[30] Foreign Application Priority Data

Jun. 4, 1996 [DE] Germany ............ 196 22 343

[51] Int. Cl.⁷ .................................. B23P 15/00
[52] U.S. Cl. ................... 29/895.3; 29/895.211; 29/895.33; 492/33; 492/48
[58] Field of Search ............ 29/895.3, 895.33, 29/895.211, 895.31, 895.32, 891; 228/145; 492/48, 33

[56] References Cited

U.S. PATENT DOCUMENTS

| | | | |
|---|---|---|---|
| 345,312 | 7/1886 | Mason, Jr. | 29/895.31 |
| 353,465 | 11/1886 | Sears | 29/895.31 |
| 2,285,375 | 6/1942 | Hansen | 29/895.32 |
| 2,338,847 | 1/1944 | Hansen | 29/895.32 |
| 2,886,169 | 5/1959 | Calder . | |
| 3,241,216 | 3/1966 | Wellendorf | 29/895.3 |
| 4,773,143 | 9/1988 | Okamura et al. | 29/895.3 |
| 5,048,182 | 9/1991 | Robbins, III | 29/895.3 |

FOREIGN PATENT DOCUMENTS

| | | |
|---|---|---|
| 0 152 085 | 12/1990 | European Pat. Off. . |
| 0169036 | 12/1981 | Japan ............ 29/895.31 |

*Primary Examiner*—I Cuda
*Attorney, Agent, or Firm*—Michael J. Striker

[57] ABSTRACT

A method of producing a roller casing of a roller has providing a plane casing blank, forming an outer helical raised structure on the plane casing blank, bending the plane casing blank with the raised structure to form a cylindrical roller casing, and connecting with one another abutting regions of the cylindrical roller casing.

4 Claims, 2 Drawing Sheets

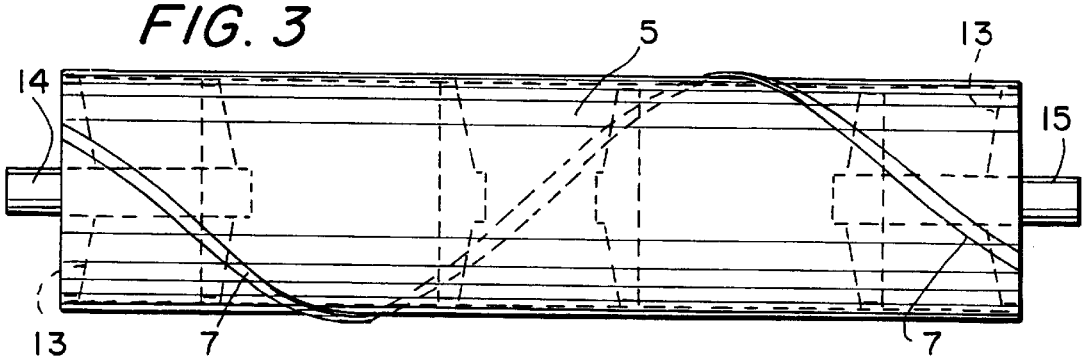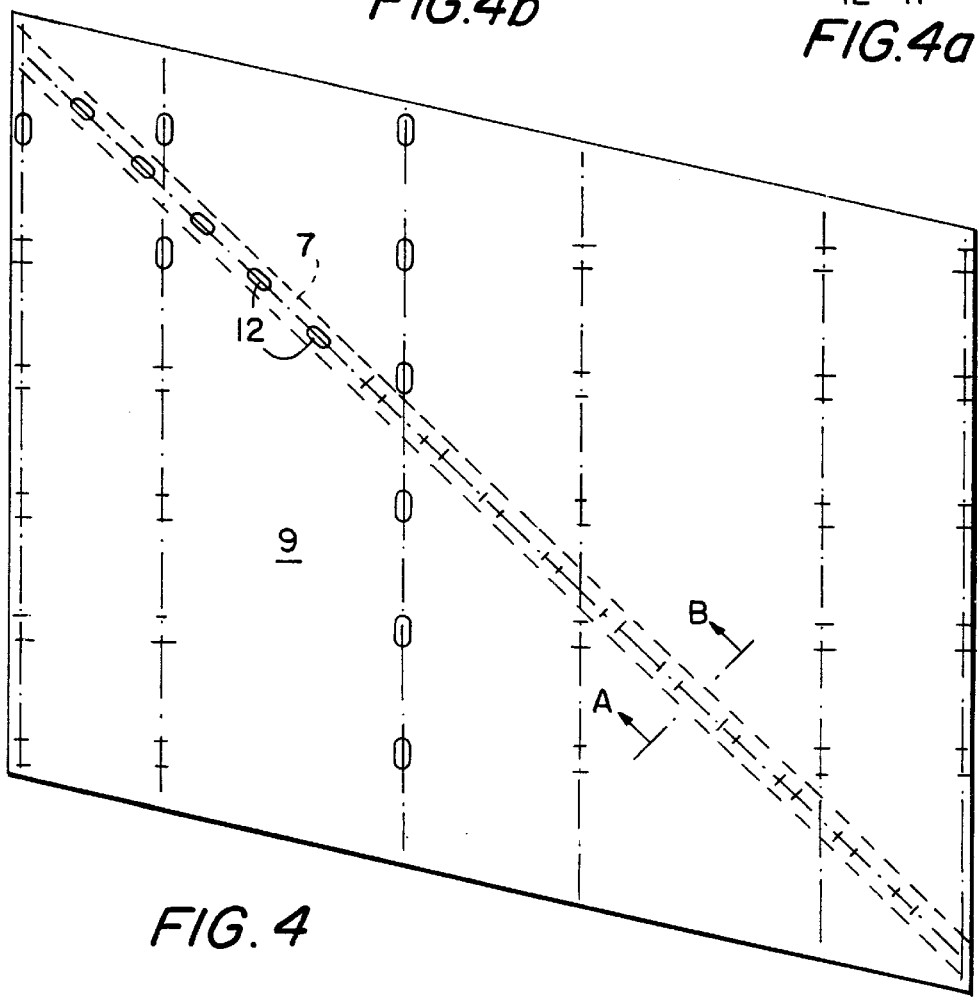

METHOD OF PRODUCING ROLLERS FOR AGRICULTURAL MACHINES

BACKGROUND OF THE INVENTION

The present invention relates to a method of producing rollers for agricultural machines.

More particularly, it relates to a method for producing a roller casing of a roller of a roller set for guiding several parallel driven bands which are used in agricultural machines for transporting or processing of harvested product or for deviating of both transporting or pressing belts, formed so that the roller casing of the roller has an outer helical raised structure.

In agricultural machines at many locations there is a need to change the product flow direction of the harvested product or the throughflow of the harvested product through an agricultural machine for providing a better transverse distribution. For obtaining such a transporting action, a helical raised structures are provided in the cylindrical, rotatable roller body for transporting the material sideways. Examples of such constructions are transverse transporting screws in a cutting mechanism, transporting screws of a pickup device, bailers or load cars or conditioning rollers in a stalk product preparing device.

In known roller bailers the pressing chamber is formed on its periphery by a plurality of rotatable bands arranged at a distance from one another. The bands are driven and guided by a plurality of rollers. In particular, during harvesting of moist product it is not possible to avoid that the harvested product discharges laterally through the distances between the neighboring bands. Therefore there is a danger that the outwardly discharged product is deposited on the rollers and thereby the guidance and the drive of the bands can be substantially affected.

In order to avoid the above described disadvantage, it has been proposed in the European patent document 0 152 085 to arrange a web provided on the outer roller casing of the roller which guides the band and extending helically around the roller casing. As a result, the harvested product passing outwardly between the bands is guided laterally. For producing such a roller, the outer roller casing is wound helically with a profile connected for example by welding with the roller casing. Also for the other mentioned examples, special helical screw plates must be produced and thereafter welded to the corresponding cylindrical body. Such operations are connected with extremely high time consumption and therefore are very expensive.

SUMMARY OF THE INVENTION

Accordingly, it is an object of the present invention to provide a method for producing a roller casing which avoids the disadvantages of the prior art. In accordance with the invention, first a plane casing blank is provided with a raised portion, then the thusly prepared casing blank is bent to form a cylindrical roller casing, and then the abutting seam regions are connected with one another.

When the method is performed in accordance with the present invention, a roller can be produced in a simple manner.

In the inventive method a plane casing blank is first utilized. A required raised portion is formed on the plane casing blank, and then the plane casing blank with the raised portion is bent to form a cylindrical roller casing. The seam regions which abut against one another are finally welded with one another. A plane rectangular casing blank can be formed for this purpose, and a diagonally extending profile strip can be mounted on it, for example a flat iron strip. The rectangular casing blank can be composed of two triangular plate sheets which abut against one another in the region of their hypotenuses. With a flat iron piece placed on the seam location a rectangular casing blank is formed by welding. The welding can be formed as point—or hole—welding.

In accordance with another embodiment of the invention, first a plane rectangular casing blank is formed, and a diagonally extending ferration is pressed in it, before rolling the casing blank to form a cylindrical casing.

For obtaining winding of the raised structure on the roller casing over more than 360°, the casing blank is formed as a displaced parallelogram with two obtuse and two acute angles, and the raised structure is applied along the longest of the two diagonals.

In accordance with a further feature of the present invention, several parallel raised structures are formed on the plane lying casing blank.

Alternatively, in order to form a throughgoing raised structure applied on the casing blank, a plurality of pins having the same height and extending at narrow distances from one another can be mounted on the casing blank. After bending of the casing blank to form a cylindrical roller casing, binding elements can be arranged helically on the pins.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIG. 3 is a plain view of the roller of FIG. 2;

FIG. 4 is a view showing a roller casing of the roller of FIG. 4a–b in FIG. 4; and FIGS. 4a–4d are views showing a cross-section taken along the line A–B in FIG. 4.

DESCRIPTION OF PREFERRED EMBODIMENTS

In accordance with the present invention a roller set for guiding several bands which are driven parallel to one another is provided. The bands peripherally limit a pressed chamber of a roller baler for an agricultural machine so as to leave a product inlet opening. The present invention can be also used identically for other applications of cylindrical bodies having a helically extending raised structure.

Figure 1:
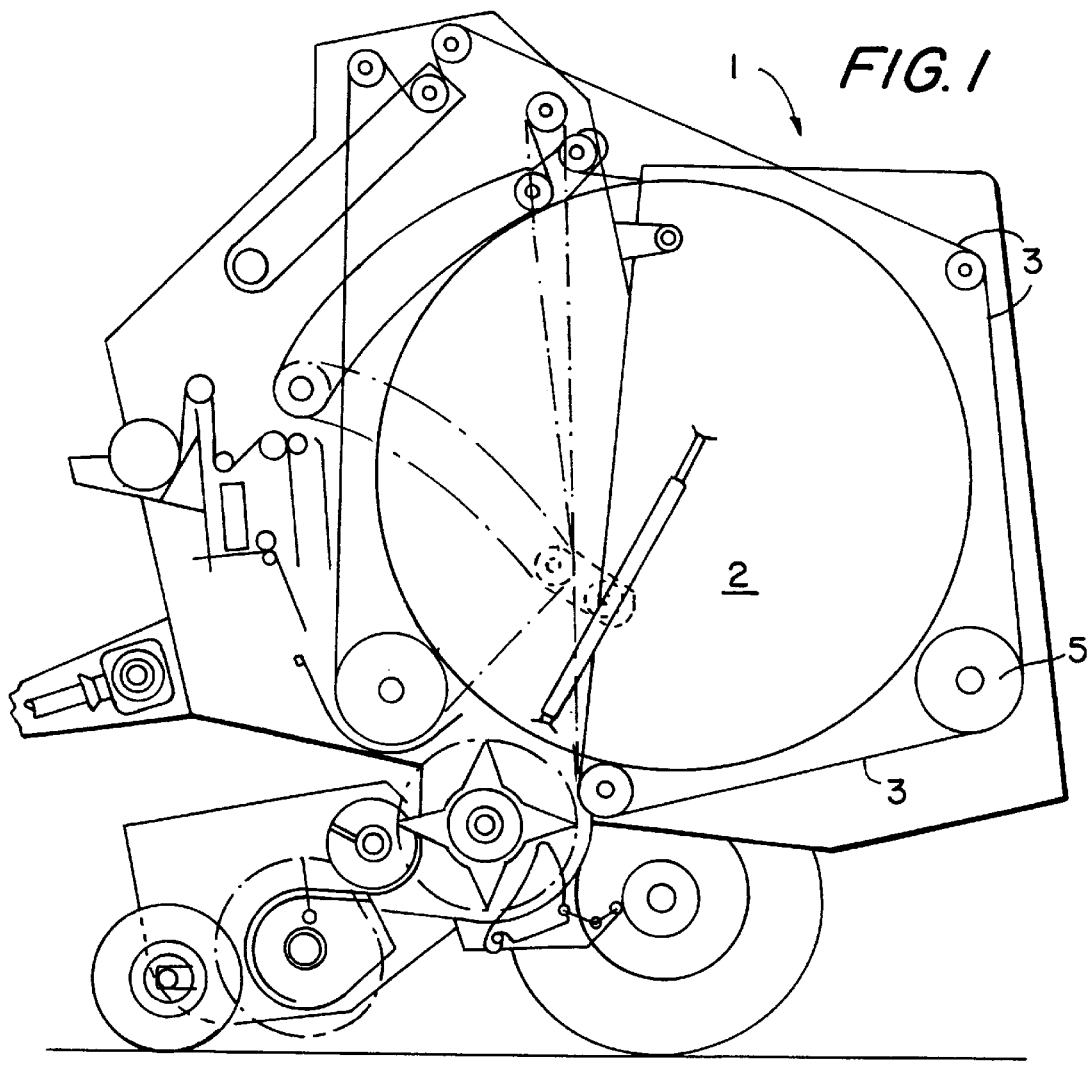
FIG. 1 is a side view of a round bailer in accordance with the prior art.

In FIG. 1 a known round baler is identified as a whole with reference numeral 1. The round baler 1 has a pressing chamber which is formed peripherally by a plurality of bands 3. The bands extend parallel near one another at small distances from one another. They are guided by a plurality of rollers. For example a roller 5 has a roller casing 6 provided with profile strips 7 which surround the roller casing helically. Harvested product which is laterally discharged outwardly from the pressure chamber 2 through intermediate spaces 3 is laterally guided by the profile strips 7. Therefore, the product no longer can deposit on the guiding roller.

Figure 2:
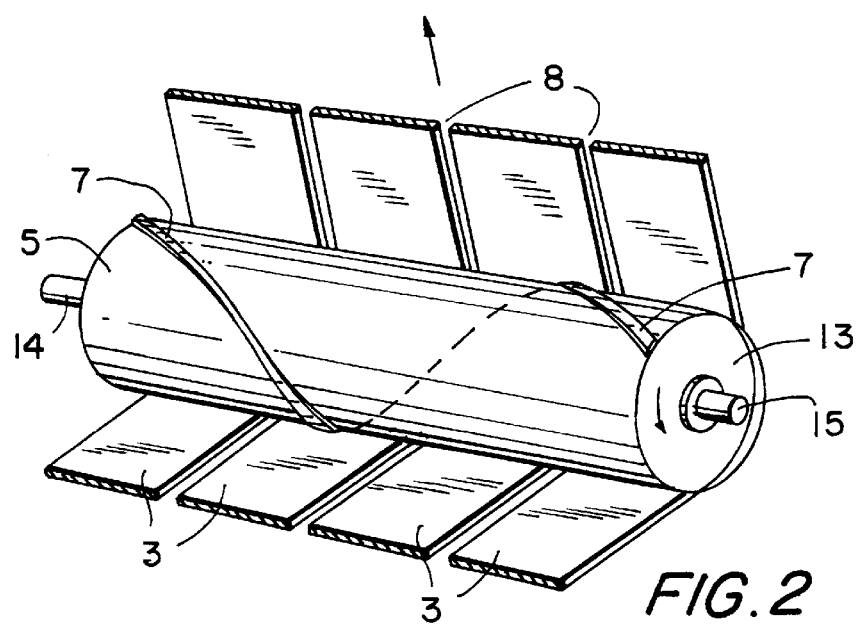
FIG. 2 is a perspective view showing a band guiding roller of a round bailer shown in FIG. 1 with mounted profile strips.

The roller strip shown in FIGS. 2 and 3 can be produced in a simple manner. For example, first a plane roller casing blank 9 is formed, as shown in FIG. 4. This blank has the shape of a displaced parallelogram with two oppositely located obtuse angles and two oppositely located acute angles. A flat iron element 7 is placed along the longest of the both diagonals of the blank 9 and is connected with the casing blank by slot welding 11. For this purpose, the blank 9 is provided with a plurality of throughgoing openings so that the slot welding can be performed from the side of the casing, so as to form later the inner side of the casing. The throughgoing openings are identified with reference numeral 12. Since the profile strips 7 extend along the longest diagonal of the blank 9, the roller casing 6 formed from the casing blank 9 is surrounded by the profile strip 7 over more than 360°. FIG. 4a shows how the profile strip 7 is connected with the blank 9 by a slot welding 11.

Alternatively to the above described embodiment, as shown in FIG. 4a corrugations 10 can be pressed into the blank 9 of the roller casing. They can have shapes which are shown in FIGS. 4b and 4c.

As can be seen from FIG. 3, the roller casing 6 formed from the roller blank 9 is supported from inside by several plates 13. The plates 13 located in the end regions of the roller 5 support axial pins 14 and 15.

The radial raised structure on the roller 5 provided by the profile strips 7 or the corrugations 10 amounts to several millimeters. For the cylindrical rollers which must be used in other application areas and which must provide greater radial distances, it is necessary to take care that the extension of the profiled strips or corrugations in the outer region are not so great that the profile strips of the corrugations crack. If a diameter of the cylindrical body is small that without a separation of the profiled strips or corrugations, in the outer regions cracks can develop, the profile strips or corrugations in individual pre-formed segments which can overlap in a transporting direction are arranged in one line on the casing blank.

Instead of profile strips or corrugations, also pins can be arranged on the casing blank 9. Then synthetic plastic guiding surfaces extending helically around the cylindrical body can be mounted on the pins in inexpensive manner. Such an arrangement provides the advantage that in the event of a high wear of the guiding plates, they can be exchanged with low expenses and very fast.

It will be understood that each of the elements described above, or two or more together, may also find a useful application in other types of methods differing from the types described above.

While the invention has been illustrated and described as embodied in method producing rollers for agricultural machines, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A method of producing a roller casing of a roller, comprising the steps of providing a plane casing blank in the form of a displaced parallelogram with two obtuse angles and two acute angles; forming an outer helical raised structure on the plane casing blank along a longer diagonal of the parallelogram; bending the plane casing blank with two raised structure to form a cylindrical roller casing; and connecting with one another abutting regions of the cylindrical roller casing, said forming including forming on the casing blank a plurality of pins having an identical height and spaced from one another by narrow distances; and mounting helically arranged guiding means on the pins after bending the casing blank to form the cylindrical roller casing.

2. A method of producing a roller casing of a roller, comprising the steps of providing a plane casing blank in the form of a displaced parallelogram with two obtuse angles and two acute angles; forming an outer helical raised structure on the plane casing blank along a longer diagonal of the parallelogram; bending the plane casing blank with two raised structure to form a cylindrical roller casing; and connecting with one another abutting regions of the cylindrical roller casing, said providing including providing a planar rectangular casing blank, said forming including forming on the planar rectangular casing blank the raised structure In form of a diagonally extending profile strip, said forming including slot welding of the profile strip of the casing blank.

3. A method of producing a roller casing of a roller, comprising the steps of providing a plane casing blank in the form of a displaced parallelogram with two obtuse angles and two acute angles; forming an outer helical raised structure on the plane casing blank along a longer diagonal of the parallelogram; bending the plane casing blank with two raised structure to form a cylindrical roller casing; and connecting with one another abutting regions of the cylindrical roller casing, said providing including providing a plane rectangular casing blank, said forming including pressing a diagonally extending corrugation on the planar rectangular casing blank.

4. A method as defined in claim 1, and further comprising the step of providing additional raised structure on the casing blank.

* * * * *